United States Patent
Casey et al.

(10) Patent No.: US 11,329,537 B2
(45) Date of Patent: May 10, 2022

(54) SUPER-SYNCHRONOUS MOTOR/GENERATOR

(71) Applicant: X Development LLC, Mountain View, CA (US)

(72) Inventors: Leo Francis Casey, San Francisco, CA (US); Siyuan Xin, Los Altos, CA (US)

(73) Assignee: X Development LLC, Mountain View, CA (US)

( * ) Notice: Subject to any disclaimer, the term of this patent is extended or adjusted under 35 U.S.C. 154(b) by 327 days.

(21) Appl. No.: 16/401,430

(22) Filed: May 2, 2019

(65) Prior Publication Data

US 2020/0350808 A1  Nov. 5, 2020

(51) Int. Cl.
*H02K 16/02* (2006.01)

(52) U.S. Cl.
CPC .................. *H02K 16/025* (2013.01)

(58) Field of Classification Search
CPC ...... H02K 16/025; H02K 16/00; H02K 16/02; H02K 47/20
USPC ........................................................ 310/114
See application file for complete search history.

(56) References Cited

U.S. PATENT DOCUMENTS

| | | | | |
|---|---|---|---|---|
| 4,827,171 A | * | 5/1989 | Bertram | H02K 7/108 310/162 |
| 4,841,185 A | * | 6/1989 | Weldon | H02K 16/00 310/115 |
| 5,744,895 A | * | 4/1998 | Seguchi | B60W 10/26 310/266 |
| 5,838,085 A | * | 11/1998 | Roesel, Jr. | H02K 7/20 310/113 |
| 7,834,495 B1 | * | 11/2010 | Mitchell | H02K 16/00 310/68 B |
| 8,084,909 B2 | | 12/2011 | Goodzeit et al. | |
| 8,643,238 B2 | | 2/2014 | Ling | |
| 2007/0090707 A1 | * | 4/2007 | Moriya | B60K 6/448 310/113 |
| 2010/0171451 A1 | * | 7/2010 | Quere | H02K 16/00 318/400.09 |
| 2010/0219706 A1 | * | 9/2010 | Watanabe | B60W 20/00 310/107 |
| 2012/0326539 A1 | * | 12/2012 | Webster | H02K 16/00 310/46 |

(Continued)

OTHER PUBLICATIONS

Rashad et al., "Starting and Vector Control of Series-Connected Wound-Rotor Induction Motor in Super Synchronous Mode," IEEE, Oct. 2004, 8 pages.

(Continued)

*Primary Examiner* — Alex W Mok
(74) *Attorney, Agent, or Firm* — Fish & Richardson P.C.

(57) ABSTRACT

A compound motor-generator system including a first motor-generator and a second motor-generator. The first motor generator includes a stator having a set of three-phase field windings and a first rotor disposed inside and coaxial with the stator and configured to rotate relative to the stator. The second motor-generator includes a rotational stator and a second rotor coupled to a common shaft with the rotor of the first motor-generator and disposed inside and coaxial to the rotational stator. The rotational stator is configured to rotate relative to the second rotor and at a higher rotational speed than the second rotor.

18 Claims, 6 Drawing Sheets

(56) References Cited

U.S. PATENT DOCUMENTS

| | | | | |
|---|---|---|---|---|
| 2015/0130316 A1* | 5/2015 | Caine | ............... | H02K 16/005 |
| | | | | 310/115 |
| 2016/0036366 A1* | 2/2016 | Yang | ............... | H02K 19/103 |
| | | | | 318/701 |
| 2016/0111949 A1* | 4/2016 | Franzen | ............ | H02K 21/12 |
| | | | | 310/113 |
| 2017/0025977 A1* | 1/2017 | Armstrong | ........... | H02K 7/11 |

OTHER PUBLICATIONS

Rashad et al., "Theory and Analysis of Three-Phase Series-Connected Parametric Motors," IEEE, Dec. 1996, 6 pages.

\* cited by examiner

SUPER-SYNCHRONOUS MOTOR/GENERATOR

BACKGROUND

An electric motor-generator is a machine that can operate as either an electric motor or an electric generator. In the case of a compound machine, a motor-generator can perform both motor operation and generator operation at the same time. A motor-generator can be used for energy storage, or for maintaining the power quality of an electrical distribution. A motor-generator can also be used for converting voltage, frequency, and/or phase of electrical power.

SUMMARY

This specification relates to a super-synchronous motor-generator. More specifically, the disclosure relates to a motor-generator that operates at multiples of an alternating current electrical distribution system (AC system) frequency, such as two or three times the frequency.

A motor-generator that operates at super-synchronous speeds can be used to improve overall system cost and efficiency. In energy storage applications, the amount of energy storage can be vastly increased by using super-synchronous machines. Additionally, achieving super-synchronous speeds without the use of power electronics can reduce the complexity of the overall machine and the service required to properly maintain the machine.

In a super-synchronous motor-generator, two or more machines are connected, each including a rotor and a stator. The two or more machines can be located alongside one another end-to-end, or can be concentric to one another. The machines may be of different types, including synchronous, induction, reluctance, and permanent magnet.

A super-synchronous motor-generator can include two or more machines connected alongside one another, end-to-end. In this configuration, the first stator surrounds the first rotor and is stationary. The first stator flux wave rotates at synchronous speed. The first rotor is internal, and also rotates at synchronous speed, matching the frequency of the supplied AC electrical current. The first rotor is connected end-to-end (e.g., on a common or coupled shaft) to the second rotor, and they rotate at the same speed. The second stator surrounds the second rotor, and is a rotational stator. For example, the rotational second stator rotates around a common axis with the second rotor. The rotational second stator flux wave rotates at a speed that is the combination of the second rotor flux wave and the second rotor mechanical rotation speed. Thus, the rotational second stator rotates at double the synchronous speed.

A super-synchronous motor-generator can include two or more machines connected concentrically. In this configuration, the stationary stator is in the center. The first stator flux wave rotates at synchronous speed. The rotor is concentric with and outside the stationary stator, and rotates at synchronous speed along with the flux wave of the stationary stator. A movable stator is concentric with and outside the rotor. The movable stator generates a flux wave that rotates at a speed that is the combination of the rotor flux wave and the rotor mechanical rotation speed. Thus, the rotational second stator rotates at double the synchronous speed.

In general, one innovative aspect of the subject matter described in this specification can be embodied in a compound motor-generator system including a first motor-generator and a second motor-generator. The first motor generator includes a stator having a set of three-phase field windings and a first rotor disposed inside and coaxial with the stator and configured to rotate relative to the stator. The second motor-generator includes a rotational stator and a second rotor coupled to a common shaft with the rotor of the first motor-generator and disposed inside and coaxial to the rotational stator. The rotational stator is configured to rotate relative to the second rotor and at a higher rotational speed than the second rotor.

In general, another innovative aspect of the subject matter described in this specification can be embodied in a compound motor-generator system including a stator having a set of three-phase field windings; a first rotor disposed inside and coaxial with the stator, the first rotor configured to rotate relative to the stator; and a second rotor disposed inside and coaxial with the first rotor. The second rotor is configured to rotate relative to the first rotor and at a higher rotational speed than the first rotor.

The foregoing and other embodiments can each optionally include one or more of the following features, alone or in combination. The system may include a third motor-generator including a second rotational stator coupled to the rotational stator of the second motor-generator, and a third rotor disposed inside and coaxial with the second rotational stator and configured to rotate relative to the second rotational stator. The second rotational stator may be configured to rotate relative to the third rotor and to drive the third rotor at a higher rotational speed than the rotational speed of the second rotational stator.

In some implementations, the second rotor includes permanent magnets to supply a rotor magnetic field, and the rotational stator includes three-phase field windings configured to produce, when driven by an electrical power source, a rotational magnetic flux that rotates in a direction opposite to a direction of rotation of the second rotor.

In some implementations, the second rotor includes three-phase field windings configured to produce, when driven by an electrical power source, a magnetic flux that rotates relative to the second rotor, and the rotational stator includes permanent magnets or DC field windings configured to produce a magnetic field that is stationary relative to the rotational stator.

In some implementations, the rotational stator is coupled to a prime mover.

In some implementations, the rotational stator is coupled to a mechanical energy storage mechanism.

In some implementations, the rotor of the first motor-generator includes permanent magnets to supply a rotor magnetic field.

In some implementations, the first motor-generator and the second motor-generator are synchronous electric machines or induction machines.

The system may include an auxiliary motor coupled to the first motor-generator as a starting motor.

In some implementations, the first rotor includes permanent magnets to supply a rotor magnetic field that is stationary with respect to the first rotor, and the second rotor includes three-phase field windings configured to produce, when driven by an electrical power source, a rotational magnetic flux that rotates, relative to the second rotor, in a direction opposite to a direction of rotation of the first rotor.

In some implementations, the first rotor includes three-phase field windings configured to produce, when driven by an electrical power source, a magnetic flux that rotates relative to the first rotor, and the second rotor includes permanent magnets or DC field windings configured to produce a magnetic field that is stationary relative to the rotational stator.

In some implementations, the second rotor is coupled to a prime mover.

In some implementations, the second rotor is coupled to a mechanical energy storage mechanism.

In some implementations, the stator and the first rotor operate as a synchronous machine or as an induction machine.

In some implementations, the first rotor and the second rotor operate as a synchronous machine.

The system may include an auxiliary motor coupled to the first rotor as a starting motor. The system may include an auxiliary motor coupled to the second rotor as a starting motor.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In a grid-connected power generation, or energy storage, design, there is generally a combination of electronic and electromechanical devices deployed between the grid and the prime mover or power source/storage. These devices are used to condition and transfer the power and energy in a controlled fashion. For rotational systems, this chain of electrical and electronic stages typically consists of an isolation transformer, a motor-generator, power electronics, and a gearbox to match the prime mover speed and the motor-generator speed. Alternatively, power electronics can be used to change the frequency of a motor-generator to match the frequency of the grid, typically using back to back AC/DC power converters.

A motor-generator that operates at super-synchronous speeds can be used to improve overall system cost and efficiency. Additionally, achieving super-synchronous speeds without the use of power electronics may reduce the complexity of the machine and the service required to properly maintain the machine.

This specification relates to a super-synchronous motor-generator. More specifically, the disclosure relates to a motor-generator that can operate at multiples of an AC system frequency, such as two or three times the frequency.

In a super-synchronous motor-generator, two or more machines are connected, each including a rotor and a stator. In some examples, the rotor and stator windings are fed from a three-phase AC electrical grid. In some examples, one or more of the rotors include a permanent magnet. The two or more machines can be located alongside one another end-to-end, or can be concentric to one another.

Figure 1A:
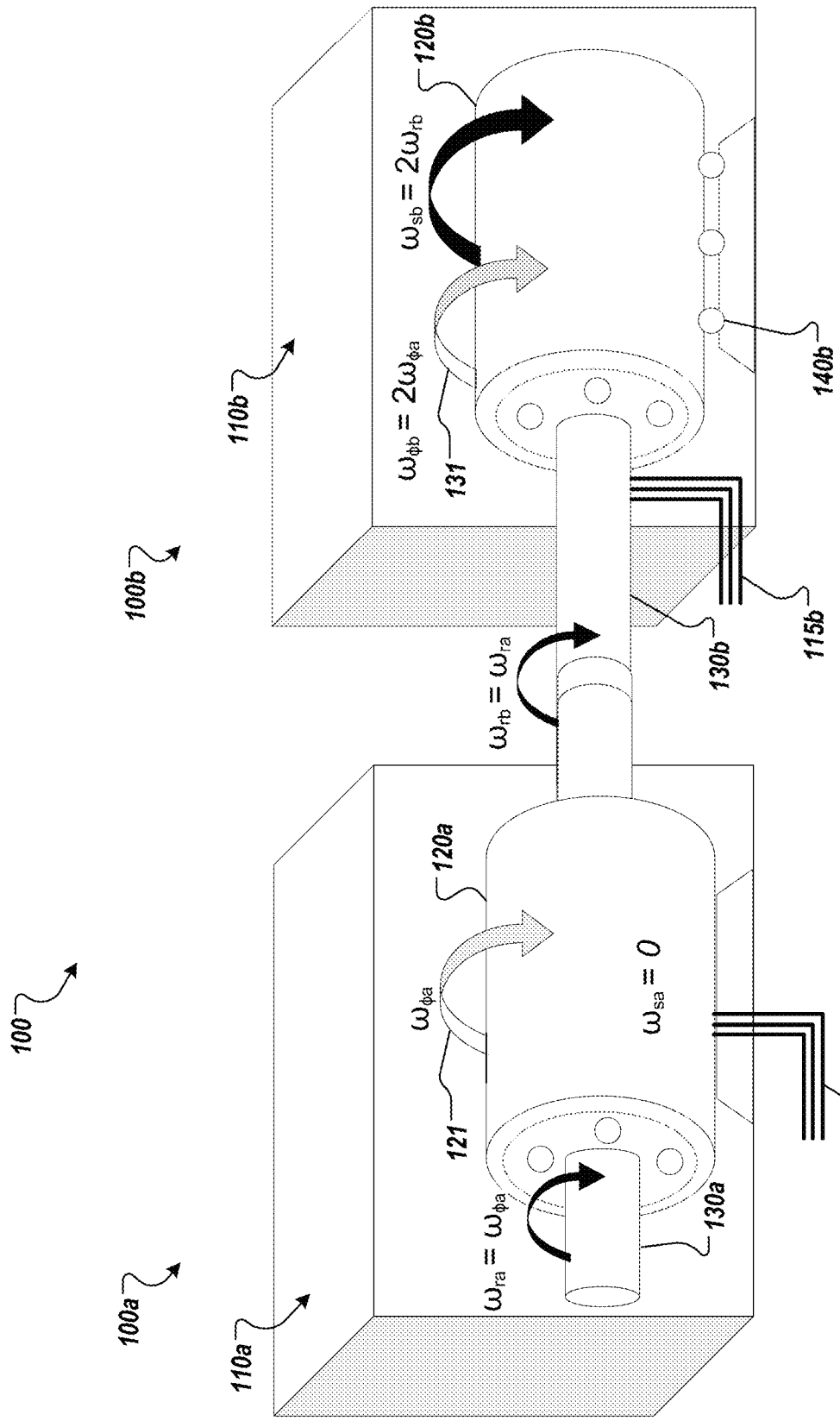
FIGS. 1A and 1B are diagrams of exemplary implementations of super-synchronous motor-generators in an end-to-end configuration.
Figure 1B:
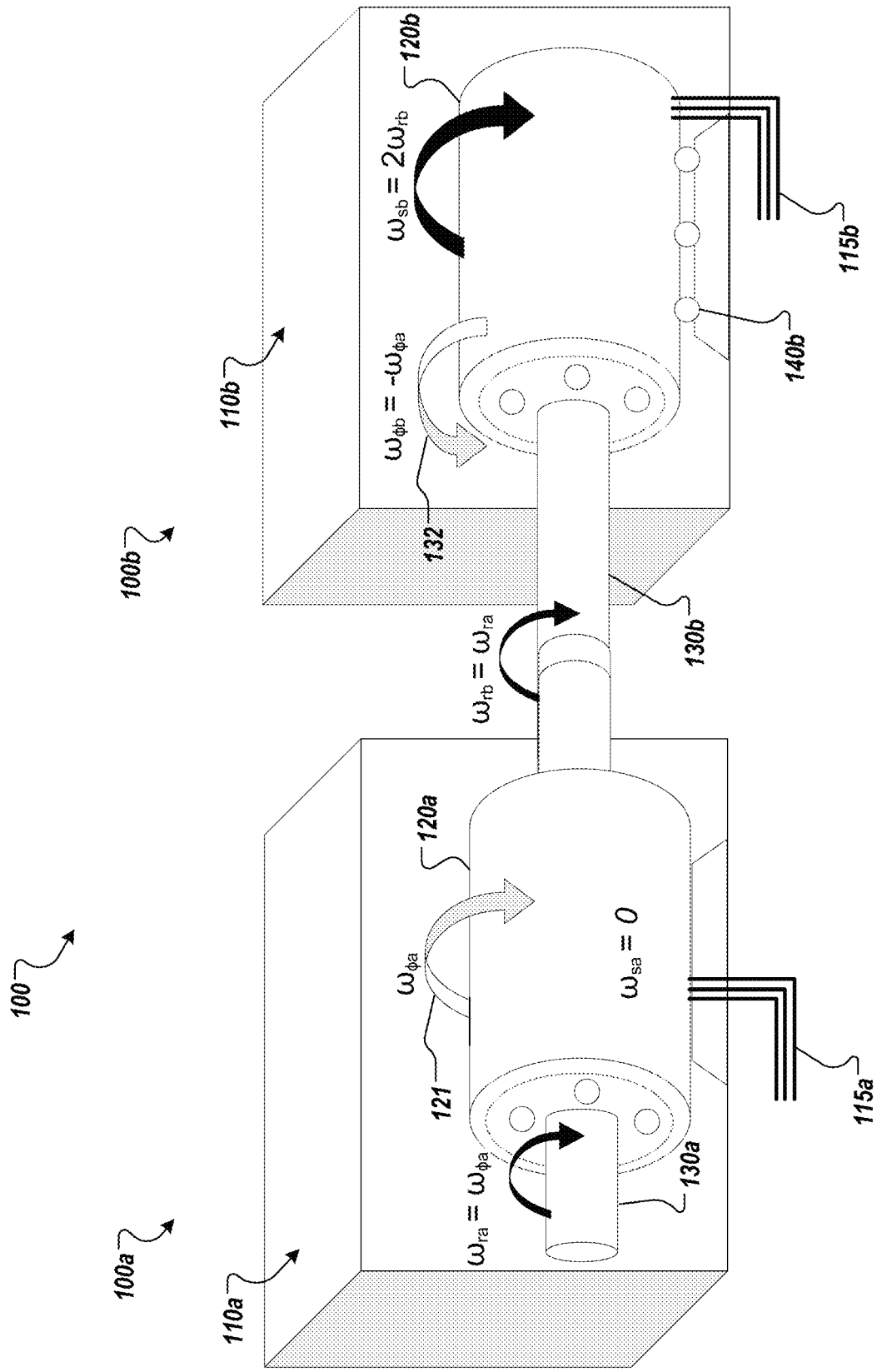

FIGS. 1A and 1B are diagrams of an exemplary super-synchronous motor-generator 100 in an end-to-end configuration. The motor-generator 100 includes a first machine 100a coupled to a second machine 100b. The first machine 100a includes a stationary housing 110a that encases a first stator 120a and a first rotor 130a. The second machine 100b includes a housing 110b that encases a second stator 120b and a second rotor 103a. The second stator 120b of the second machine 100b is configured as a rotational stator. For example, the second stator 120b can be mounted on bearings 140b instead of being fixed to the housing 110b. As such, the second stator 120b is free to rotate relative to the housing 110b and/or relative to, and independent of, the second rotor 130b.

Although illustrated as two separate housings 110a, 110b, both machines 100a, 110b can be enclosed in a common housing. The motor generator 100 can be considered as a compound machine because, as noted above, the first machine 100a is coupled to the second machine 100b. For example, first machine 100a can be coupled to second machine 100b by coupling the first rotor 130a to the second rotor 130b, e.g., by a common shaft or by a mechanical coupling between the two rotors.

In the example in FIGS. 1A and 1B, both first machine 100a and second machine 100b can be configured as synchronous machines. In a synchronous machine, the mechanical rotation of a rotating component (e.g., a rotor) aligns with a rotating magnetic field, i.e., the mechanical rotational speed is substantially equal to the rotational speed of a rotating magnetic field produced by a stator.

The motor-generator 100 can operate as a motor. Briefly, when operating as a motor, electrical power is supplied to stator 120a of the first machine 100a causing rotor 130a to mechanically rotate. The rotation of rotor 130a causes rotor 130b of the second machine 100b to rotate, which (as described in more detail below) cause the rotational stator 120b to rotate at twice the mechanical speed of rotor 130b.

Figure 5A:
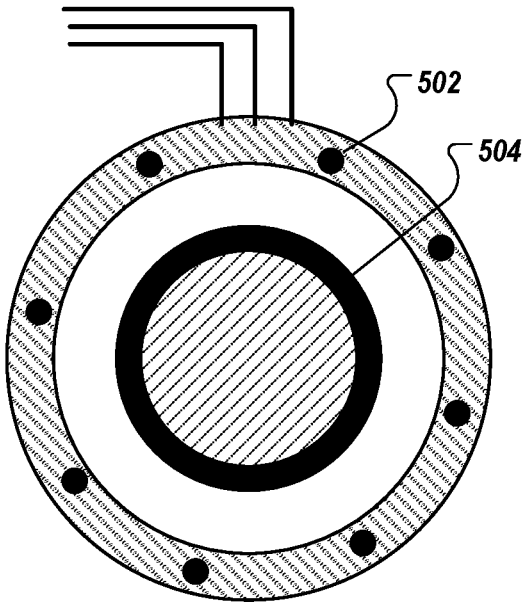
FIGS. 5A to 5D are cross-sectional diagrams of the embodiments of super-synchronous motor-generators shown in FIGS. 1 to 4.

In more detail, when the motor-generator 100 operates as a motor, electrical power is supplied to first machine 100a. The source of the electrical power can be, for example, a three-phase AC electrical distribution system. The electrical power source supplies electrical current through power cables 115a to the armature windings of first stator 120a (e.g., as illustrated by element 502 in FIG. 5A). The electrical current supplied to the armature windings of first stator 120a creates a magnetic flux that rotates at an angular speed $\omega_{\phi a}$.

The first stator 120a magnetic flux rotates at synchronous angular speed $\omega_{\phi a}$, which means that the rotational speed of the magnetic flux matches the frequency of the power supplied from the AC system. For example, if the frequency of the AC system is 60 Hertz (Hz), the first stator 120a magnetic flux rotates at a speed $\omega_{\phi a}$ of 3600 revolutions per minute (rpm), or a factor of 3600 rpm, where 3600 rpm is divided by the number of pole pairs. Though the first stator 120a magnetic flux rotates at synchronous speed, as noted above, the first stator 120a is mechanically stationary.

Figure 5B:
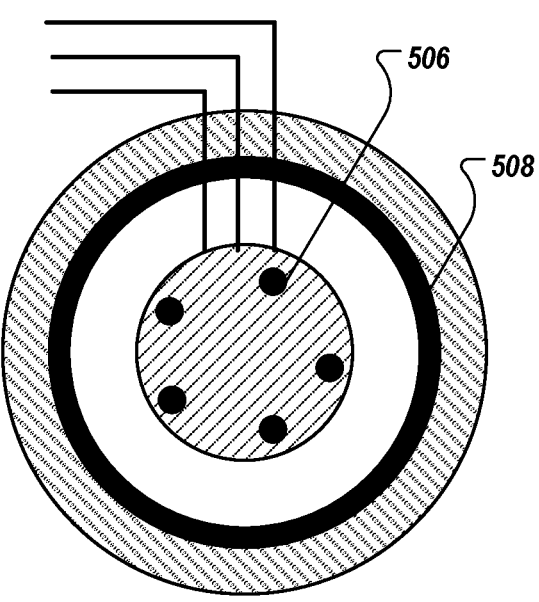
Figure 5C:
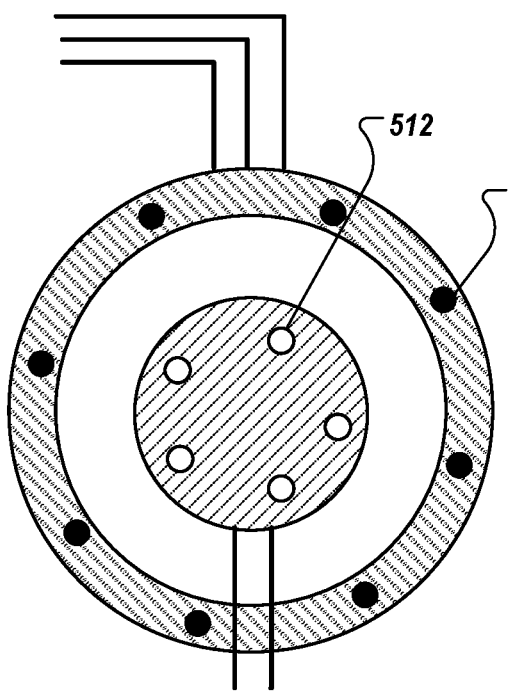

A first rotor 130a rotates to align with the first stator 120a magnetic flux at a mechanical rotational speed equal to the rotational speed of the stator magnetic flux. The first rotor 130a can be constructed with either field windings (e.g., as illustrated by element 512 in FIG. 5C) or one or more permanent magnets (e.g., as illustrated by element 504 in FIG. 5A) to produce a stationary magnetic field on the rotor field that follows or "locks onto" (e.g., in a synchronous motor design) the rotating magnetic flux 121 of the first stator 120a. The rotating magnetic flux produced by the first stator 120a causes the first rotor 130a to rotate at an angular speed $\omega_{ra}=\omega_{\phi a}$.

The first rotor 130a is mechanically connected with the second rotor 130b. For example, the first rotor 130a and second rotor 130b can be on a common shaft, or can be mechanically coupled. The mechanical rotation of the first rotor 130a drives the second rotor 130b at a speed $\omega_{rb}$ that is equal to $\omega_{ra}$.

In the example illustrated in FIG. 1A, the second rotor 130b includes a set of three-phase windings (e.g., as illustrated by element 506 in FIG. 5B) that achieves a rotating magnetic flux. The three-phase windings can be driven to create a rotational magnetic flux 131 that rotates at $\omega_{\phi b}$ with respect to the second rotor 130b. For example, the magnetic flux 131 of the second rotor 130b can be driven through power cables 115b coupled to a power source. The field windings of the second rotor 130b can be driven by the same or a different power source as that used to drive the field windings of the first stator 120a. The three-phase windings are driven to create a rotational magnetic flux 131 that rotates in the same direction $\omega_{\phi b}$ as the rotor itself rotates, such that the second rotor's magnetic flux 131 rotates at, for example, twice the synchronous speed of the first machine 110a, e.g., $\omega_{\phi b}=2\omega_{\phi b}$.

The rotational second stator 120b is mounted on high-speed bearings 140b that allow the rotational second stator 120b to mechanically rotate with respect to the stationary housing 110b. The second stator 120b includes either field windings (e.g., as illustrated by element 518 in FIG. 5D) driven by a DC source or a permanent magnet (e.g., as illustrated by element 508 in FIG. 5B) to generate a stationary magnetic field (e.g., stationary with respect to the second stator 120b). The stator field then "locks onto" (e.g., in a synchronous motor design) the second rotor's rotating magnetic flux 131 causing the rotational stator 120b to rotate at the same speed as the second rotor's rotating magnetic flux 131, e.g., the speed ($\omega_{sb}$) of the rotational stator is twice the speed ($\omega_{rb}$) of the second rotor 130b ($\omega_{sb}=2\omega_{rb}$). Further, assuming that both machines 100a and 100b are operated as synchronous machines, the rotational second stator 120b will rotate at twice the synchronous speed of the first machine 110a.

For example, if the second rotor 130b rotates at 3600 rpm in a clockwise direction, the second rotor 130b magnetic flux 131 also rotates in a clockwise direction but at 7200 rpm. The rotational second stator 120b stationary field will follow the rotating magnetic flux 131 of the second rotor 130b causing the rotational second stator 120b to also rotate at 7200 rpm in the clockwise direction.

In another example illustrated in FIG. 1B, the second rotor 130b can be configured with a stationary magnetic field rather than a rotating magnetic field. For example, the second rotor 130b can include field windings (e.g., as illustrated by element 512 in FIG. 5C) driven by a DC source or a permanent magnet (e.g., as illustrated by element 504 in FIG. 5A) to produce a magnetic field that is stationary with respect to the second rotor 130b. However, the second rotor's magnetic field will still rotate at a speed of $\omega_{rb}$ with respect to housing 110b as the second rotor 130b is driven by the first rotor 130a. In such examples, super-synchronous speed of the rotational second stator 120b can be achieved with respect to the first machine 100a by driving field windings (e.g., as illustrated by element 514 in FIG. 5C) on the second stator 120b to produce a rotational magnetic flux 132 that rotates at a speed $\omega_{\phi b}$ with respect to the rotational second stator 120b. Specifically, the field windings of the second stator 120b are driven so as to produce a magnetic flux 132 that rotates at the same speed as the magnetic flux 121 of the first stator 120a, but in an opposite direction; e.g., $\omega_{\phi b}=-\omega_{\phi a}$. Hence, by extension, the second stator's magnetic flux 132 is also driven in a direction opposite to the rotation of the second rotor 130b. Thus, when the magnetic flux 132 "locks onto" the stationary field of the second rotor 130b, as the second rotor rotates, the interaction between the second stator's magnetic flux 132 and the magnetic field of the second rotor 130b will tend to "push" the rotational second stator 120b at twice the speed at which the second rotor 130b rotates. In other words, the speed ($\omega_{sb}$) of the rotational stator will be twice the speed ($\omega_{rb}$) of the second rotor 130b ($\omega_{sb}=2\omega_{rb}$).

For example, if the second rotor 130b rotates at 3600 rpm in a clockwise direction, the second rotor's 130b magnetic field will also rotates in a clockwise direction at 3600 rpm. The rotational second stator 120b is driven to produce a magnetic flux that rotates relative to the second stator 120b at 3600 rpm, but in the counter-clockwise direction. For example, the phases of the field windings of the second stator 120b can be coupled to power cables 115b according to a phase sequence that produces an opposite direction of field rotation as compared to the phase sequence connection between the power cables 115a and the field windings of the first stator 120a. Thus, if the second rotor were held stationary, and the rotational second stator 120b allowed to freely rotate, the second stator's magnetic flux 132 would tend to push the second stator 120b in the clockwise direction at 3600 rpm. However, when this effect is combined with the rotation of the second rotor 130b as driven by the first rotor 130a, the second rotor 120b drives the rotational second stator 120b at 7200 rpm in the clockwise direction (e.g., $\omega_{sb}=\omega_{rb}-\omega_{\phi b}=2\omega_{rb}$, where $\omega_{rb}=\omega_{\phi a}$ and $\omega_{\phi b}=-\omega_{\phi a}$).

In some applications, the rotational second stator 120b can be coupled to a mechanical energy storage device, such as a flywheel. Additional details about energy storage implementations are described below in reference to FIG. 3.

When the motor-generator 100 operates as a generator, a prime mover is connected to, or coupled with, the rotational second stator 120b. The prime mover can be, for example, any type of turbine such as a steam turbine or gas turbine, or any type of engine such as a diesel engine or gasoline piston engine. Because the super-synchronous motor generator 100 can operate at super-synchronous speeds, the motor generator 100 can produce a 60 Hz electrical output while the prime mover is operated at speeds in excess of 3600 rpm without the need for reduction gears or frequency converters. For example, a prime mover can be driven at 7200 rpm, which is two times the fundamental operating frequency of a 3600 rpm, or 60 Hz, system. Synchronous devices rotate at f/N, where f is the electrical frequency and N is the number of pole pairs in the device, nominally 1 for high speed motor-generators. The prime mover can be driven at 7200 rpm without the need for reduction gears.

When operating as a generator, the super-synchronous motor generator 100 operates in a manner similar to that described above in reference to FIGS. 1A and 1B except that the prime mover provides the motive force to the rotational second stator 120b, and the relative motion of the first rotor 130a with respect to stator coils of the first stator 120a induces an output voltage/current on the stator coils. The electric current then feeds an electrical load through power cables 115a. The load may be, for example, a three-phase AC electrical distribution system.

In some examples, a supplemental electrical power source can be used to power the field windings of the second stator 120b (or the second rotor 130b, depending on the configuration of the second machine 100b) e.g., when the motor generator 100 is started up.

Figure 2:
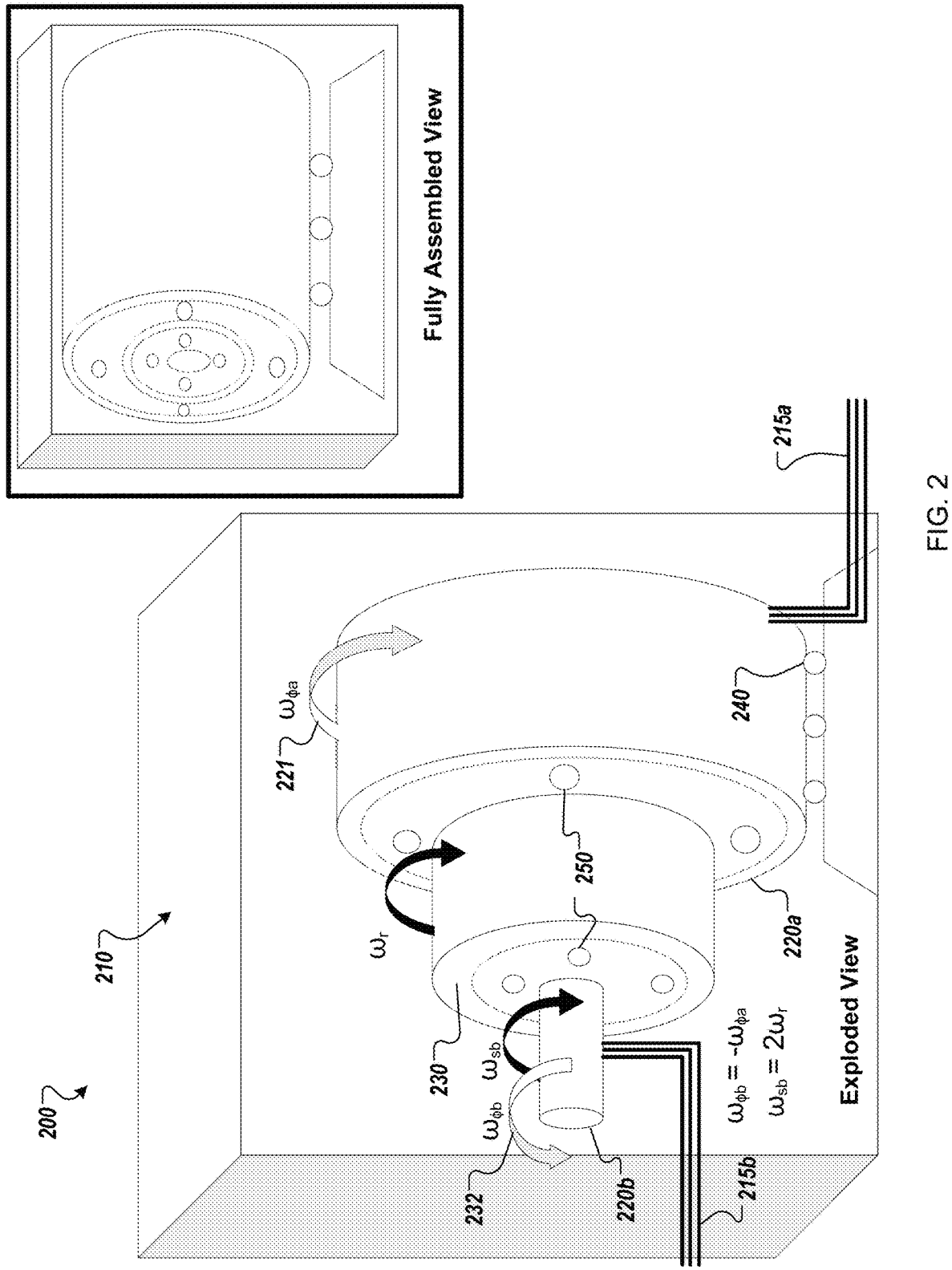
FIG. 2 is a diagram of an exemplary super-synchronous motor-generator in a concentric configuration.

FIG. 2 includes both an exploded-view diagram and a fully assembled-view diagram of an exemplary super-synchronous motor-generator 200 in a concentric configuration. Motor-generator 200 is similar to motor-generator 100, in that it is a compound machine, however, instead of the machines being coupled end-to-end as in motor-generator 100, the machines are constructed concentrically, and share a common rotor. For example, motor-generator 200 includes an inner stator 220a, surrounded by a rotor 230 coaxially mounted to the inner stator on a set of bearings 250, and an outer stator 220b coaxially mounted to the rotor 230 on a set of bearings 250. Either the inner stator 220a or the outer stator 220b can be configured as a rotational stator. That is, either the inner stator 220a or the outer stator 220b can be mounted on bearings (e.g., bearings 240 and 250) such that it is free to mechanically rotate relative to the housing 210 and relative to the rotor 230. While described as a second stator for consistency with respect to the implementations shown and described in reference to FIGS. 1A and 1B, the rotational stator (e.g., either second stator 220b or first stator 220a, depending on the configuration) can be considered as a second rotor. For example, rotational stator 220b can be considered as a second rotor disposed within a hollow first rotor 230 and supported on compound bearings 250.

The first stator 220a includes three-phase field windings (e.g., armature windings as illustrated by element 502 in FIG. 5A)) configured to generate a rotational magnetic flux ($\omega_{\phi a}$). For example, the first stator windings can be driven by an electrical power source through power cables 215a (when operating as a motor). When operating as a generator, an output voltage/current is induced on the first stator coils through electro-magnetic interaction with a magnetic field produced by the rotor 230.

As discussed with respect to the implementations depicted in FIGS. 1A and 1B, in some implementations, the rotor 230 can include either field windings (e.g., as illustrated by element 512 in FIG. 5C) driven by a DC source or a permanent magnet (e.g., as illustrated by element 504 in FIG. 5A) to generate a stationary magnetic field (e.g., stationary with respect to the rotor 230), while the second stator 220b includes three-phase windings (e.g., armature windings as illustrated by element 516 in FIG. 5D) to generate a rotating magnetic flux. The second stator windings can be driven by an electrical power source through power cables 215b.

In some implementations, the rotor 230 can include three-phase field windings to generate a rotating magnetic flux, (e.g., as illustrated by element 502 in FIG. 5A) while the second stator 220b includes either field windings (e.g., as illustrated by element 512 in FIG. 5C) driven by a DC source or a permanent magnet (e.g., as illustrated by element 504 in FIG. 5A) to generate a stationary magnetic field (e.g., stationary with respect to the second stator 220b). The rotor windings can be driven by an electrical power source through power cables 215b.

Similar to motor-generator 100 described above, the exemplary motor-generator 200 in FIG. 2 can operate as a motor or a generator. When operating as a motor, electrical power is supplied to first machine 200a, causing machine 200b to mechanically rotate. When operating as a generator, a prime mover couples to machine 200b, causing machine 200a to produce electrical power.

The operations of motor generator 200 are similar to those of the two implementations of motor generator 100 described above. Thus for brevity, only the motor operations of the permanent magnet rotor 230 implementation of motor generator 200 are described below. When operating as a motor, electrical power is supplied to the first stator 220a. The source of the electrical power can be, for example, a three-phase AC electrical distribution system. The electrical power source supplies electrical current through power cables 215a to the armature windings of the first stator 220a. The electrical current supplied to the armature windings of first stator 220a creates a magnetic flux that rotates at an angular speed $\omega_{\phi a}$.

The first stator 220a magnetic flux rotates at synchronous angular speed $\omega_{\phi a}$, which means that the rotational speed of the magnetic flux matches the frequency of the power supplied from the AC system. For example, if the frequency of the AC system is 60 Hertz (Hz), the first stator 220a magnetic flux rotates at a speed $\omega_{\phi a}$ of 3600 revolutions per minute (rpm). Though the first stator 220a magnetic flux rotates at synchronous speed, as noted above, the first stator 220a itself is mechanically stationary.

A rotor 230 rotates to align with the first stator 220a magnetic flux at a mechanical rotational speed equal to the rotational speed of the first stator magnetic flux. The rotor 230 can be constructed with either field windings or one or more permanent magnets to produce a stationary magnetic field on the rotor. The field follows or "locks onto" (e.g., in a synchronous motor design) the rotating magnetic flux 221 of the first stator 220a. The rotating magnetic flux produced by the first stator 220a causes the rotor 230 to rotate at an angular speed $\omega_r = \omega_{\phi a}$.

The rotor 230 also rotates at the angular speed $\omega_r$ with respect to the second stator 220b. Thus, the rotor's magnetic field also rotates at a speed of $\omega_r$ with respect to the second stator 220b. In such examples, super-synchronous speed of the rotational second stator 220b can be achieved with respect to the rotor 230 by driving field windings on the second stator 220b to produce a rotational magnetic flux 232 that rotates at a speed $\omega_{\phi b}$ with respect to the rotational second stator 220b. Specifically, the field windings of the second stator 220b are driven so as to produce a magnetic flux 232 that rotates at the same speed as the magnetic flux 221 of the first stator 220a, but in the opposite direction; e.g., $\omega_{\phi b} = -\omega_{\phi a}$. Hence, by extension, the second stator's magnetic flux 232 is also driven in a direction opposite to the rotation of the rotor 230. Thus, when the magnetic flux 232 "locks onto" the magnetic field of the rotor 230, as the second rotor rotates, the interaction between the second stator's magnetic flux 232 and the magnetic field of the of the rotor 230 will tend to "push" the rotational second stator 220b at twice the speed at which the rotor 230 rotates. In other words, the speed ($\omega_{sb}$) of the rotational stator will be twice the speed ($\omega_r$) of the rotor 230 ($\omega_{sb} = 2\omega_r$).

For example, if the rotor 230 rotates at 3600 rpm in a clockwise direction, the rotor's 230 magnetic field will also rotates in a clockwise direction at 3600 rpm. The rotational second stator 220b is driven to produce a magnetic flux that rotates relative to the second stator 220b at 3600 rpm, but in the counter-clockwise direction. For example, the phases of the field windings in the second stator 220b can be coupled to power cables 115b according to a phase sequence that produces an opposite direction of field rotation as compared to the phase sequence connection between the power cables 115a and the field windings of the first stator 120a. Thus, if the rotor 230 were held stationary, and the rotational second stator 220b allowed to freely rotate, the second stator's magnetic flux 232 would tend to push the second stator 220b in the clockwise direction at 3600 rpm. However, when this effect is combined with the rotation of the rotor 230 as driven by the first stator 220a, the rotor 230 drives the rotational second stator 220b at 7200 rpm in the clockwise direction (e.g., $\omega_{sb}=\omega_r-\omega_{\phi b}=2\omega_r$, where $\omega_r=\omega_{\phi a}$ and $\omega_{\phi b}=-\omega_{\phi a}$).

Although the examples in FIGS. 1A-2 are described in reference to synchronous machines, a super-synchronous motor-generator can be constructed as induction or reluctance machines in other implementations. The rotational speeds can vary depending on the types of machines used. For example, in a motor-generator that includes induction machines, the motor-generator can achieve intermediate speeds that are in between multiples of synchronous speed, or below synchronous speed. Synchronous machines are generally not self-starting machines. If a rotor is stationary, it cannot instantly follow the rotation of the stator magnetic flux due to inertia. Therefore, a super-synchronous motor-generator that includes synchronous motors and/or synchronous generators can include a supplemental starting mechanism.

For example, one approach to starting a synchronous machine is to energize the stator from the AC electrical distribution system, and meanwhile to short the rotor windings so that the machine operates as an induction machine for starting. The machine operates as an induction machine until it comes up to near synchronous speed. When the slip is small, and the phase angle is near zero, the rotor field winding is excited, and the rotor rotation synchronizes with the stator flux rotation.

Figure 5D:
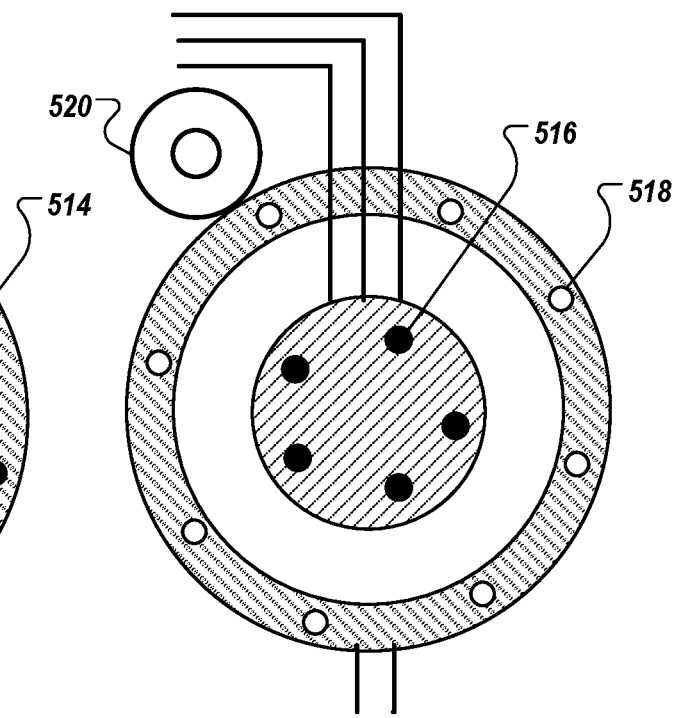

Another method for starting a synchronous machine is to use a small motor, e.g., an auxiliary or "pony" motor (e.g., as illustrated by element 520 in FIG. 5D). The pony motor can be used to accelerate a rotor to near synchronous speed before the stator winding connects to the AC electrical distribution system. When the stator windings switch on, the machine shifts to synchronous operation and the pony motor decouples. For example, auxiliary starting motors can be coupled to any of the rotors or rotational stators of the motor-generators described above to bring the respective rotational component up to its operating speed. For instance, referring to FIG. 1B, an auxiliary motors can be coupled to rotors 130a/130b (e.g., one auxiliary motor can be used to start both rotors 130a/130b since they are coupled to a common shaft) to bring rotors 130a/130b up to approximately 3600 rpm when starting the super-synchronous motor generator 100. An auxiliary motor can be coupled to the rotational stator 120b of the second machine 100b to bring the rotational stator 120b up to 7200 rpm when starting the super-synchronous motor generator 100.

Figure 3:
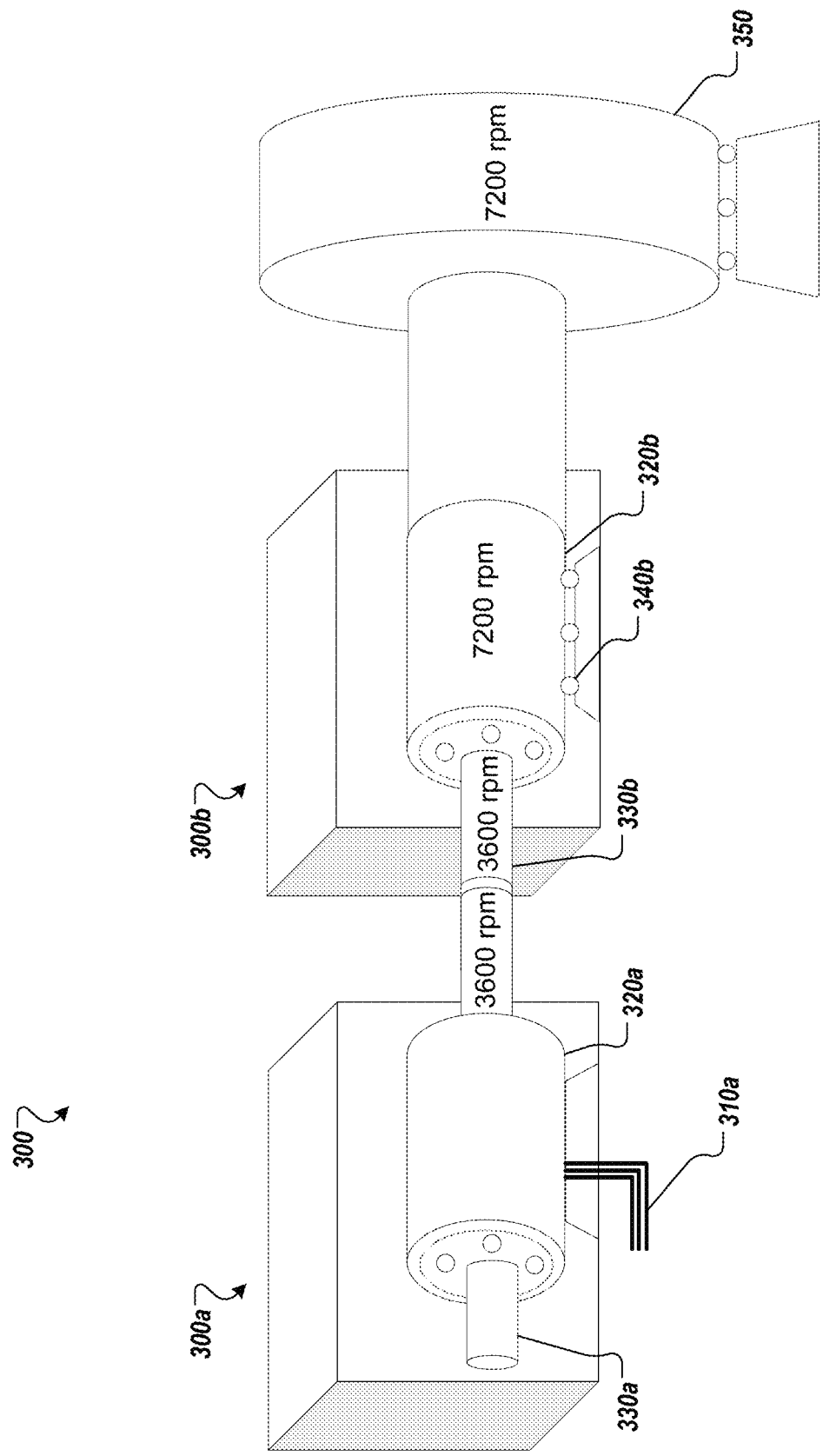
FIG. 3 is a diagram of an exemplary super-synchronous motor-generator connected to a flywheel.

FIG. 3 is an illustration of an exemplary super-synchronous motor-generator connected to a flywheel (motor-generator-flywheel). A flywheel is a spinning disk used to store energy as mechanical kinetic energy. FIG. 3 shows a super-synchronous motor-generator-flywheel 300 in an end-to-end configuration.

In the example of FIG. 3, when motor-generator-flywheel 300 operates as a motor in energy-storage mode, electrical power is supplied from a 60 Hz AC electrical distribution system to the first stator 320a of first machine 300a through electrical power cables 310a. The first rotor 330a of first machine 300a rotates to match the AC frequency at a speed of 3600 rpm. The second rotor 330b is connected or coupled to the first rotor 330a. The second rotor 330b also rotates at 3600 rpm, causing the rotational second stator 320b to rotate at 7200 rpm. The rotational second stator 320b is connected or coupled to a flywheel 350, which also rotates at 7200 rpm. The flywheel 350 is a disk that stores kinetic energy by spinning.

The amount of energy stored in a flywheel is proportional to the square of the speed of rotation. Therefore, doubling the speed of rotation of a flywheel multiplies the amount of energy storage by four. This means that the flywheel 350 spinning at 7200 rpm can store four times as much energy as the same flywheel 350 spinning at 3600 rpm. When electric power is needed, such as when there is a power outage in the AC system, the super-synchronous motor-generator-flywheel 300 can convert the energy stored in the flywheel 350 back to electrical energy.

In the example of FIG. 3, when motor-generator-flywheel 300 operates as a generator in electrical generation mode, electrical power is not provided through the power cables 310a, possibly because of a power outage. The flywheel 350 continues to rotate at 7200 rpm due to its angular momentum. Flywheels can be designed to minimize friction and air resistance. This can enable flywheels to rotate for long periods of time, such as hours or days, without being driven by a motor.

The flywheel 350 acts as a prime mover, and rotates the rotational second stator 320b at 7200 rpm. The magnetic flux created by the rotational second stator 320b causes the second rotor 330b to rotate at half the speed, or 3600 rpm.

The second rotor 330b is coupled to the first rotor 330a, which also rotates at 3600 rpm. The field windings on the first rotor 330a induce a rotating magnetic field in the armature windings on the first stator 320a. This produces a 60 Hz AC electric current that is then provided to the AC system through the power cables 310a. In this way, the super-synchronous motor-generator-flywheel 300 can provide backup power to an AC system during a power outage.

A super-synchronous motor-generator-flywheel can store more energy than a slower, synchronous motor-generator-flywheel. A two-machine motor-generator-flywheel that operates at double the frequency of an AC system may store approximately four times as much energy compared to a synchronous machine. A three-machine motor-generator-flywheel operating at triple the frequency of an AC system may store approximately nine times as much energy compared to a synchronous machine.

Super-synchronous speeds can also enable energy storage with smaller and lighter flywheels. The amount of energy storage in a flywheel is proportional to the moment of inertia, or effective mass, of a flywheel, and to the square of the rotational speed of the flywheel. Therefore, a flywheel that doubles its rotational speed can have one-fourth the effective mass while storing the same amount of energy.

Super-synchronous motor-generator-flywheels can have many applications. For example, flywheels can store energy from power sources that have peak and off-peak periods, such as solar panels and wind turbines. When there is more electricity supply than demand, AC systems can feed the excess energy to flywheels. For example, flywheels can store energy from solar panels when the sun is shining, and from wind turbines when winds are strong. Flywheels can then release the energy when there is a need, such as at night or when the winds are calm.

Another application of super-synchronous motor-generator-flywheels is maintaining electrical power quality. Power quality is the measure of voltage and frequency disturbances in an electrical system. A motor-generator-flywheel can be connected to an electrical system near an electrical power source such as a power plant. If there are small disruptions to the electrical system, such as voltage sag or momentary interruptions, the motor-generator-flywheel can provide short-term power continuity to maintain stability in the electrical system.

The example motor-generator-flywheel 300 can also be built in a concentric configuration, as shown in FIG. 2. In this configuration, the flywheel 350 connects to the outer-most rotating component. In the example of FIG. 2, the flywheel would connect to the rotating stator 220b.

Though the example in FIG. 3 shows the rotational second stator 320b connected to a flywheel 350, the flywheel 350 can be replaced with a prime mover such as a turbine or engine rotating at 7200 rpm. The operation of the motor-generator 300 with a prime mover attached to the rotational second stator 320b is similar to the operation of the motor-generator-flywheel 300 operating in power generation mode.

FIGS. 1A and 2A illustrate super-synchronous motor-generators that include two connected machines. Additional machines can be connected end-to-end or concentrically to achieve additional multiples of synchronous frequency, such as three or four times synchronous frequency.

Figure 4:
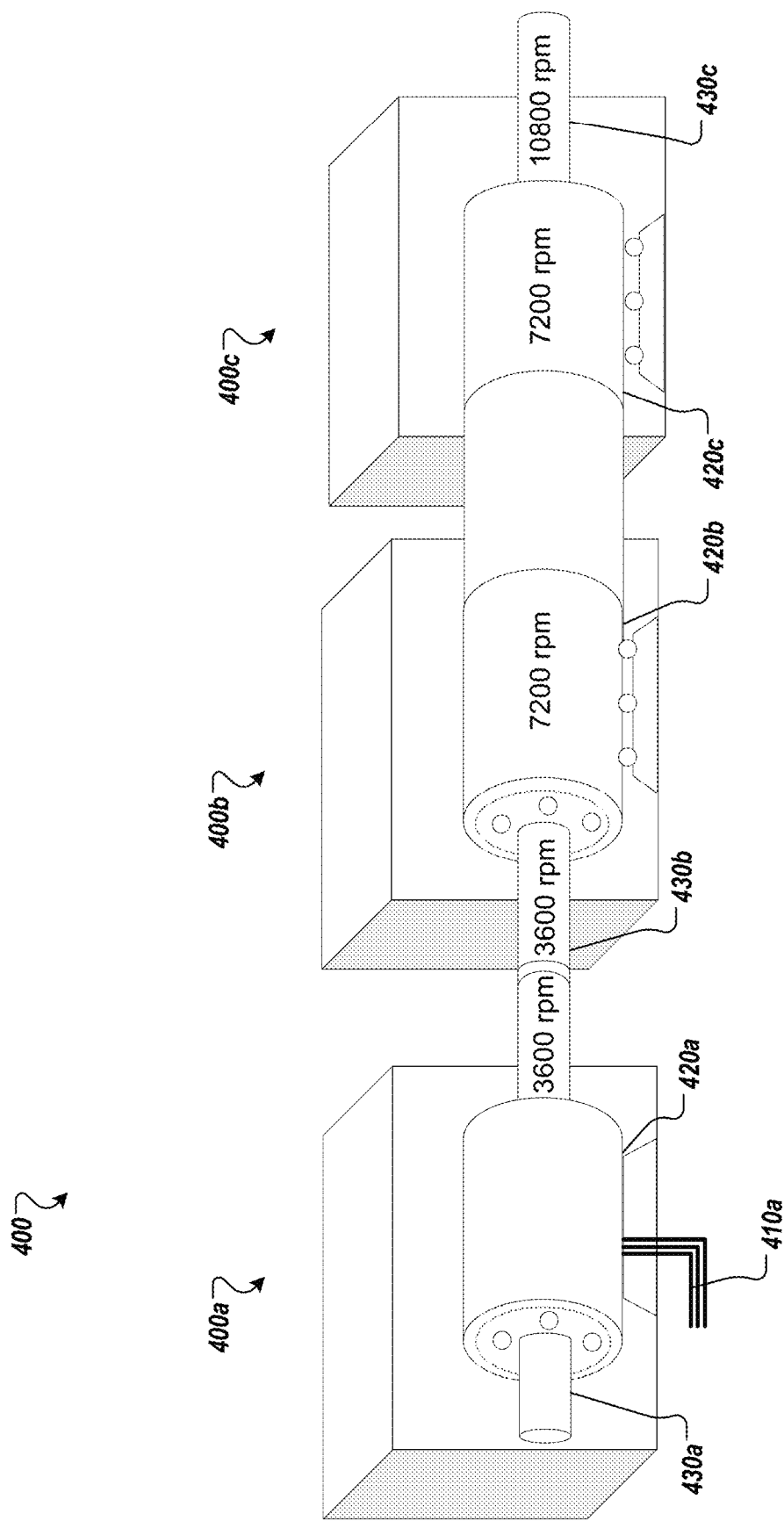
FIG. 4 is a diagram of an exemplary super-synchronous motor-generator including three connected machines.

FIG. 4 is an illustration of an exemplary super-synchronous motor-generator including three connected machines. For example, super-synchronous motor-generator 400 includes three machines, 400a, 400b, and 400c, in an end-to-end configuration. The rotor 430b of the second machine 400b is connected or coupled to the rotor 430a of the first machine. The rotational stator 420b of the second machine 400b is connected or coupled to the rotational stator 420c of the third machine 400c.

When motor-generator 400 operates as a motor, electrical power is supplied from a 60 Hz AC electrical distribution system to first machine 400a through electrical power cables 410a. The rotor 430a of the first machine 400a rotates to match the AC frequency at a speed of 3600 rpm. The rotor 430b of the second machine 400b also rotates at 3600 rpm, causing the rotational stator 420b of the second machine 400b to rotate at 7200 rpm.

The rotational stator 420b of the second machine 400b, rotating at 7200 rpm, causes the rotational stator 420c of the third machine 400c to rotate at 7200 rpm.

The rotational speed of the rotor 430c of the third machine 400c is the sum of the speed of the rotational stator 420c of the third machine 400c (e.g., 7200 rpm) and the rotational stator's magnetic flux angular speed (e.g., 3600 rpm—if driven from a 60 Hz source). Therefore, the rotor 430c of the third machine 400c rotates at 10,800 rpm.

In an energy-storage application, a motor-generator-flywheel rotating at 10,800 rpm may store approximately nine times as much energy as a motor-generator-flywheel rotating at 3600 rpm. Thus, adding additional machines to a super-synchronous motor-generator results in higher rotational speeds and much higher storage capacity.

In the example of FIG. 4, when motor-generator 400 operates as a generator, a prime mover drives the third rotor 430c at super-synchronous speeds. The prime mover can be, for example, any type of flywheel, engine, or turbine. In the example of FIG. 4, the prime mover drives the third rotor 430c at 10,800 rpm, however, the electrical output at the first machine 400a will be 60 Hz (e.g., equivalent to a 3600 rpm synchronous speed).

The example super-synchronous motor-generator 400 can include more than three machines, in either the end-to-end or concentric configurations, in order to achieve higher rotational speeds.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A compound motor-generator system comprising:
   a stator having a first set of three-phase field windings;
   a first rotor disposed inside and coaxial with the stator, the first rotor configured to rotate relative to the stator; and
   a second rotor disposed inside and coaxial with the first rotor, the first rotor or the second rotor having a second set of three-phase field windings, the second rotor configured to rotate relative to the first rotor and at a higher rotational speed than the first rotor when the first set of three-phase field windings and the second set of three-phase field windings are each energized.

2. The system of claim 1, wherein the first rotor includes permanent magnets to supply a rotor magnetic field that is stationary with respect to the first rotor, and
   wherein the second rotor includes the second set of three-phase field windings, the second set of three-phase field windings being configured to produce, when driven by an electrical power source, a rotational magnetic flux that rotates, relative to the second rotor, in a direction opposite to a direction of rotation of the first rotor.

3. The system of claim 1, wherein the first rotor includes the second set of three-phase field windings, the second set of three-phase field windings being configured to produce, when driven by an electrical power source, a magnetic flux that rotates relative to the first rotor, and
   wherein the second rotor includes permanent magnets or DC field windings configured to produce a magnetic field that is stationary relative to the second rotor.

4. The system of claim 1, wherein the second rotor is coupled to a prime mover or to a mechanical energy storage mechanism.

5. The system of claim 1, wherein the stator and the first rotor operate as a synchronous machine.

6. The system of claim 1, wherein the first rotor and the second rotor operate as a synchronous machine.

7. The system of claim 1, further comprising an auxiliary motor coupled to the first rotor or to the second rotor as a starting motor.

8. The system of claim 1, wherein the second rotor is configured to rotate at a rotational speed that is approximately twice the rotational speed of the first rotor.

9. The system of claim 1, wherein energization of each of the first set of three-phase field windings and the second set of three-phase field windings generates a rotating magnetic flux that provides a motive force for the rotation of the second rotor.

10. A compound motor-generator system comprising:
a first motor-generator comprising:
a stator having a first set of three-phase field windings, and
a first rotor disposed inside and coaxial with the stator and configured to rotate relative to the stator;
a second motor-generator comprising:
a first rotational stator, and
a second rotor coupled to a common shaft with the first rotor of the first motor-generator and disposed inside and coaxial to the first rotational stator,
wherein the first rotational stator is configured to rotate relative to the second rotor and at a higher rotational speed than the second rotor;
a third motor-generator comprising:
a second rotational stator coupled to the first rotational stator of the second motor-generator, and
a third rotor disposed inside and coaxial with the second rotational stator and configured to rotate relative to the second rotational stator,
wherein the second rotational stator is configured to rotate relative to the third rotor and to drive the third rotor at a higher rotational speed than the rotational speed of the second rotational stator.

11. The system of claim 10, wherein the second rotor includes permanent magnets to supply a rotor magnetic field, and
wherein the first rotational stator includes a second set of three-phase field windings, the second set of three-phase field windings being configured to produce, when driven by an electrical power source, a rotational magnetic flux that rotates in a direction opposite to a direction of rotation of the second rotor.

12. The system of claim 10, wherein the second rotor includes a second set of three-phase field windings, the second set of three-phase field windings being configured to produce, when driven by an electrical power source, a magnetic flux that rotates relative to the second rotor, and
wherein the rotational stator includes permanent magnets or DC field windings configured to produce a magnetic field that is stationary relative to the rotational stator.

13. The system of claim 10, wherein the third rotor is coupled to a prime mover or to a mechanical energy storage mechanism.

14. The system of claim 10, wherein the first motor-generator and the second motor-generator are synchronous electric machines.

15. The system of claim 10, wherein the first motor-generator and the second motor-generator are induction machines.

16. The system of claim 10, further comprising an auxiliary motor coupled to the first motor-generator as a starting motor.

17. The system of claim 10, wherein the first rotational stator is configured to rotate at a rotational speed that is approximately twice the rotational speed of the second rotor.

18. The system of claim 10, wherein the first rotational stator or the second rotor include a second set of three-phase field windings, wherein energization of each of the first set of three-phase field windings and the second set of three-phase field windings generates a rotating magnetic flux that provides a motive force for the rotation of the first rotational stator.

* * * * *